July 20, 1926.
H. Z. CUTLER
1,593,244
AUTOMOBILE RADIATOR
Original Filed Oct. 19, 1921   2 Sheets-Sheet 1
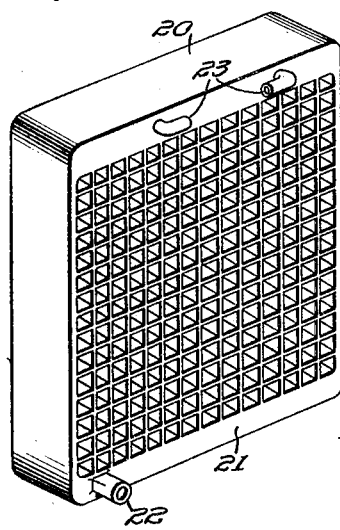
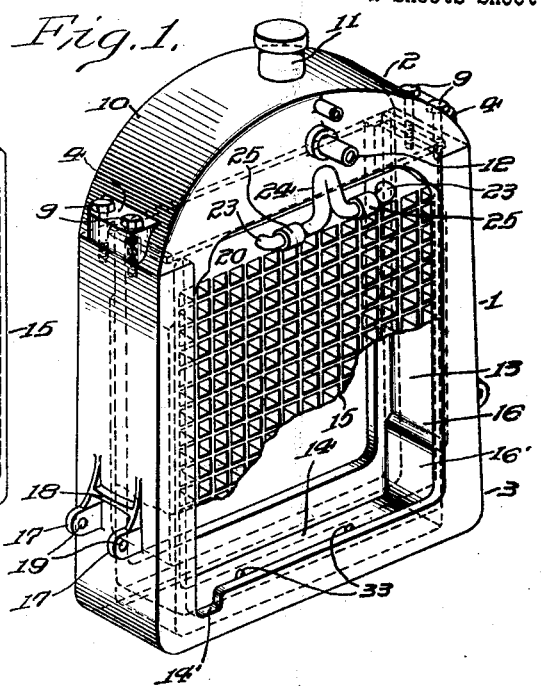
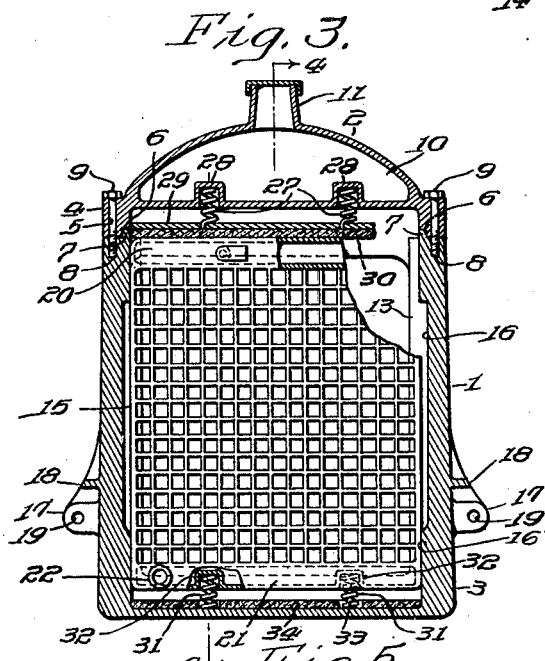
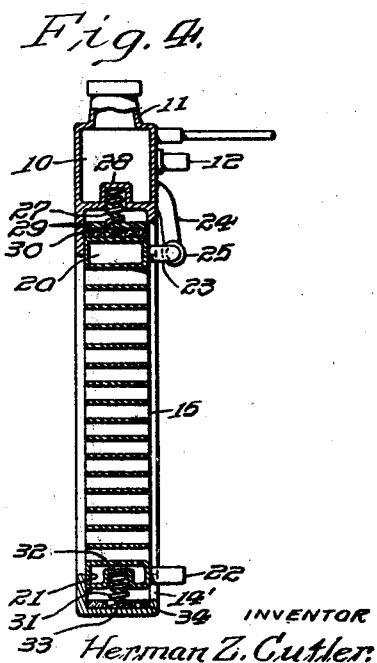
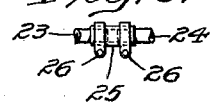
INVENTOR
Herman Z. Cutler.
WITNESS July 20, 1926.  1,593,244
H. Z. CUTLER
AUTOMOBILE RADIATOR
Original Filed Oct. 19, 1921  2 Sheets-Sheet 2

INVENTOR
Herman Z. Cutler
ATTORNEYS

Patented July 20, 1926.

1,593,244

UNITED STATES PATENT OFFICE.

HERMAN Z. CUTLER, OF CAMDEN, NEW JERSEY, ASSIGNOR TO CUTLER AUTO RADIATOR COMPANY, A CORPORATION OF NEW JERSEY.

AUTOMOBILE RADIATOR.

Application filed October 19, 1921, Serial No. 508,746. Renewed February 12, 1926.

A principal object of my invention is to provide a radiator for automobiles comprising a water cooling core and a casing or housing therefor made up of two separable sections so arranged that by removal of the upper section the core may be readily withdrawn from the lower section for repair, replacement or renewal.

A further object of my invention is to provide means in an automobile radiator of the character aforesaid for resiliently supporting the core within the casing in such manner as to protect the core from damage by jars, shocks or strains incident to the operation of the automobile and to permit slight relative movement between the core and the casing when required.

A still further object of the invention is to provide a radiator for automobiles the parts of which may be readily standardized in manufacture thereby permitting irreparably damaged parts to be replaced by a new part without requiring the replacement of the radiator in its entirety as is frequently the case of radiators of unit construction.

My invention further includes all of the other objects and novel features of construction and arrangement hereinafter more definitely specified and described.

As the principles of my invention may be readily adapted to radiators of different structural forms and intended for use on pleasure cars as well as on the heavier forms of automotive vehicles such as trucks, I have for the purpose of enabling those skilled in the art to comprehend and practise the invention illustrated in the accompanying drawings certain embodiments thereof showing the invention as applied to a radiator for the heavier type of vehicles as well as applied to a radiator intended for use on a well known form of light car.

Figure 6:
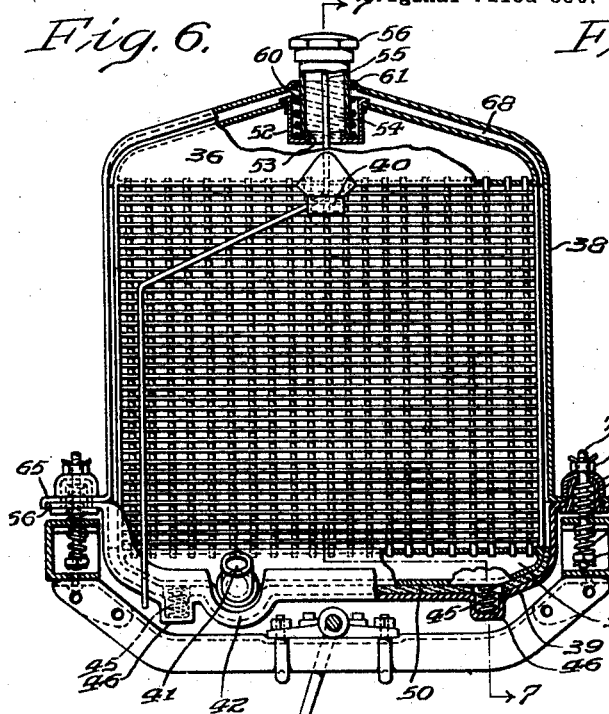
Figure 7:
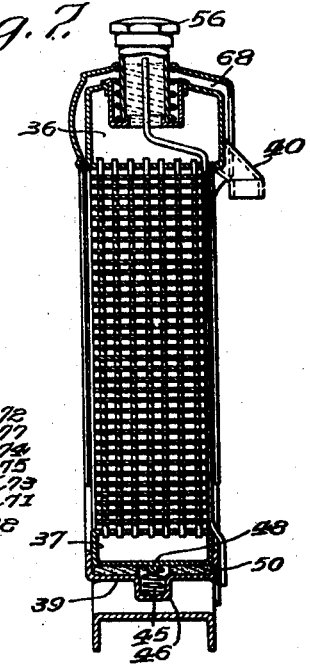
Figure 8:
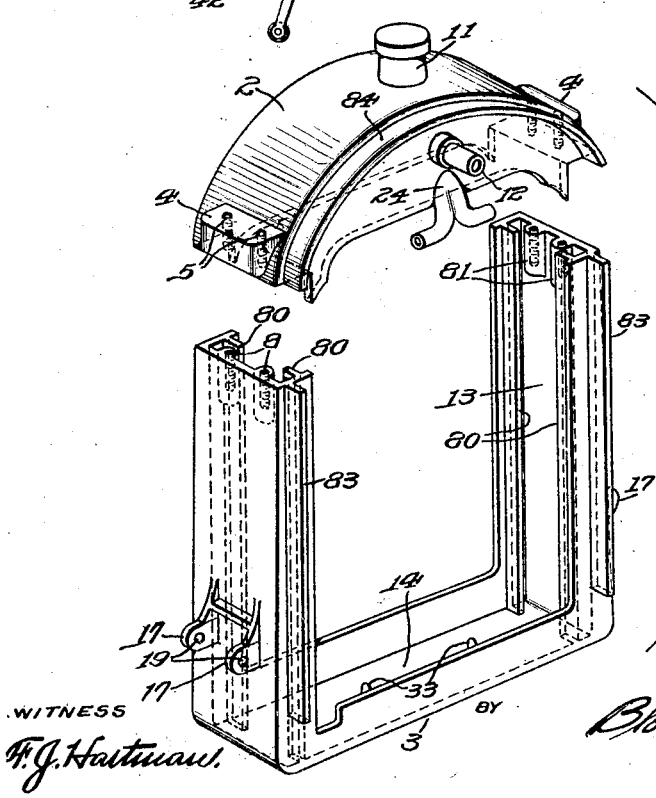

Referring to said drawings Fig. 1 is a rear perspective view, with certain parts broken away, of one embodiment of the invention intended more particularly for use on trucks or the like; Fig. 2 is a rear perspective view of the radiator core removed from the outer casing or shell; Fig. 3 is a central vertical transverse section through the assembled radiator; Fig. 4 a vertical section on the line 4—4 in Fig. 3 looking in the direction of the arrows and Fig. 5 a fragmentary view showing one of the flexible water connections between the core and casing; Fig. 6 is a rear view, partially in elevation and partially in vertical section of a radiator intended for use on a well known form of light automobile and showing portions of the same adjacent the radiator; Fig. 7 is a vertical section on the line 7—7 in Fig. 6 and Fig. 8 is a rear perspective view of a form of casing or shell particularly suitable for use in a radiator of the general type shown in Figs. 1 to 5 inclusive but differing in certain particulars from the form of shell shown therein. Like numerals are used to designate corresponding parts in the several figures.

Referring now more particularly to the form of invention shown in Figs. 1 to 5 inclusive, the metal shell or casing 1 of the radiator is formed with an upper section 2 and a lower section 3, the former having lugs 4 provided with bolt holes 5 and recessed as at 6 to fit snugly over flanges 7 on the upper ends of the lower section 3 in which are also provided screw threaded holes 8 for the reception of bolts 9 which extend through the bolt holes 5 to secure the sections firmly but detachably together, the flange 7 seated within the recesses 6 assisting in positioning the upper section on the lower and strengthening the joint therebetween, so that when the sections are bolted together they form a rigid unitary structure. A water tank 10 may be formed within the upper section 2 with which communicates the usual filler tube 11 and an inlet pipe 12 adapted to be connected by a flexible hose or the like with the water jacket of the motor.

The lower section 3 in this form of the invention may comprise the channels 13 within its sides and a channel 14 within its bottom, these channels being adapted to receive the radiator core 15 which is adapted to fit freely within the channels so as to be capable of slight relative movement with respect to the casing when required. If desired the channels on the sides of the shell may be recessed at their centers as at 16 so as to provide a relatively wide clearance between the inner face of the channel and the outer face of the core save adjacent the upper and lower extremities of the channel. As in this form of the invention the shell or casing is ordinarily of cast metal by recessing the channels in the manner aforesaid it is only necessary to machine the surfaces 16' adjacent the upper and lower ends thereof, the recessed portion of the channel being left rough. Suitable means are provided for attaching the casing to the frame of the automobile conveniently comprising lugs 17 formed integrally with the lower section 3 and connected by a strengthening bar 18, said lugs having openings 19 adapted to register with a corresponding opening in a member (not shown) carried by the automobile frame, a bolt passing through the several openings being employed to secure the lugs and member firmly together.

The core 15, which is preferably unitary, may be of any type suitable for effecting the cooling of the water in the radiator, the form illustrated being of the well known honeycomb construction and having a header tank 20 at its top and an outlet tank 21 at its bottom having a water outlet connection 22 adapted to be connected, by a hose or the like, with the motor, a recess 14' being preferably formed in the rear wall of the channel 14 to accommodate the water outlet. The header tank 20 is provided with inlets 23 and the tank 10 with an outlet 24 connected by suitable flexible connections 25 of hose or the like with the inlets 23, hose clamps or other like means 26 being utilized for holding the connections in position.

Suitable means are provided for yieldingly or resiliently supporting the core within the sectional casing comprising, in the embodiment of the invention now being described, a plurality of springs 27 preferably of the coil type the upper part of each spring being positioned in a suitable pocket 28 formed in the bottom of the tank 10 and the lower extremity engaging within a suitable hole provided in a flat plate 29 which bears upon a layer of cushioning material 30 such as felt or the like disposed upon the upper surface of the header tank 20 of the core, while a plurality of springs 31 preferably of the coil type, are disposed between the lower end of the core and the bottom of the casing, the upper ends of these springs being contained in pockets 32 formed within the base of the tank 21 and the lower ends engaging over pins or posts 33 projecting upwardly from the bottom of the channel 14, a layer of felt or other suitable cushioning material 34 being preferably disposed within the channel.

With the parts constructed and assembled substantially as described it will be noted that I have provided a radiator in which the core is yieldingly or resiliently supported within the casing in such manner that any shocks or strains incident to the operation of the automobile and which are received by the casing will be absorbed by the springs and not communicated to the core with sufficient violence to damage the same, the resiliency of the springs and cushioning layers permitting the core to float within the casing and permitting limited freedom of movement with respect thereto.

It will further be noted that the core may be readily disassembled from the casing without removing the lower section of the latter from the automobile if desired, for by removing the bolts 9 and disconnecting the several flexible connections the upper section of the casing may be lifted from the lower section 3, plate 29, springs 27 and cushioning layer 30 removed and the core lifted vertically out of the lower section. After the core has been repaired it may then be readily replaced within the lower section 3 or if desired, a new core substituted for the old one and the several parts reassembled.

The form of the invention shown in Figs. 6 and 7 is more particularly intended for use in connection with the well known Ford automobile and as a substitute for the standard radiator thereof, the core in this form of my invention being, as in the form already described, resiliently or yieldingly supported within the outer shell or casing so as to be substantially immune from the shocks and strains incident to the operation of the automobile, and as the particular embodiment of the invention illustrated is intended, as stated, to replace the standard Ford radiator I have shown so much of the adjacent parts of the frame and radiator mounting of the Ford car of standard design as will afford a clear understanding of a preferred manner of adapting my invention thereto.

The core or water cooling portion of the radiator, which is shown as of the well known tubular construction, is provided with a receiving tank 36 at its upper extremity and an outlet tank 37 at its lower, these two tanks together with the central tubular section of the core forming a single operative unit which, when the radiator is assembled, is enclosed about its periphery with a casing or shell which may be either of cast metal, or as shown, formed of suitable stampings and which comprises an upper section 38 and a lower section 39. This latter section is in the form of a suitable channel adapted to receive the lower part of the core while the upper part of the upper section is so formed as to enclose and form a housing for the upper part of the core from which, however, it is preferably slightly spaced to afford a suitable clearance between the parts. The header tank is provided with the usual inlet pipe 40 adapted to be connected to the motor through suitable hose connections (not shown) and the lower tank with an outlet 41 adapted to be similarly connected, the lower section 39 being suitably shaped adjacent this outlet, as at 42, to receive the same.

The core is supported within the casing through the medium of suitable yielding or resilient means preferably comprising a plurality of coil springs 45 the lower part of each spring being seated in a pocket 46 formed in the lower section and the upper part projecting above the inner upper surface thereof to engage about a suitable pin or post 48 projecting downwardly from the lower face of the core so as to position the spring with respect thereto. I also preferably provide a cushioning layer of felt or other suitable resilient material 50 between the lower face of the core and the upper surface of the section.

For centering and yieldingly supporting the upper part of the core within the shell or casing I preferably provide at the center of the upper part of the core a spring receiving cup 52 the major portion of which is disposed within the tank 36. This cup may be provided with a central upwardly directed flange 53 surrounding an opening 54 and adapted to receive the lower end of the filler pipe 55 which extends upwardly through the housing and carries the usual cap 56, the lower end of this pipe being soldered or otherwise suitably secured to the flange and the opening in the housing through which the pipe extends being of sufficient diameter to permit the latter to move freely therein. Surrounding the filler pipe and disposed within the cup and the housing is a coil spring 60 of suitable strength, one end of the spring resting on the bottom of the cup and the other on the under side of the housing which may conveniently be suitably formed at this point to snugly receive the spring as at 61.

The sides of the upper section 38 are continued downwardly to a point relatively near the bottom of the core and are the then turned outwardly in opposite directions to provide feet 65 while the sides of the lower section 39 are directed upwardly for a short distance and thence outwardly in opposite directions to form corresponding feet 66, the length of the sides of the upper and lower sections being such that when the feet on both sections are brought together as shown in Fig. 6 the core resting on the cushioning material and springs 45 will have a suitable clearance 68 between its top and the under side of the housing.

The radiator may be supported on the frame of the automobile in accordance with the standard practice as shown, namely by the medium of a bolt 70 extending through the frame 71 of the automobile and carrying a nut 72 adjacent each of its ends, a spring 73 surrounding the bolt being interposed between the nut and the lower side of the frame and a similar spring 74 being interposed between the upper side of the frame and the under surface of an inverted flanged thimble 75 the body of which extends upwardly through suitable apertures in the feet 65 and 66 and is received in a cup 77 which rests on the upper surface of the foot 65. In this manner the two sections of the radiator casing are clamped snugly together and the whole casing yieldingly supported on the frame while within the casing the core and tanks as an operating unit are free to float with respect to the casing and are thus relieved from any strains imparted to or distortion of the latter. Furthermore, it will be noted that the upper surface of the casing may be readily removed from the lower when desired and the core lifted vertically from the latter for effecting repairs or replacements, the flexible connections between the core and the motor of course being loosened before the core is lifted out.

In Fig. 8 I have shown a slightly different form of casing which is particularly adapted for use in connection with radiators intended for trucks or heavy cars and of the general form shown in Figs. 1 to 5, this casing having an upper section 2 and a lower section 3, lugs 4 and bolt holes 5 in the manner already described.

Instead, however, of providing suitably machined surfaces 16′ adjacent the upper and lower extremities of the side channels to form supporting guides for the core as in the form of the invention shown in Figs. 1 to 5, I may provide the side walls of the channels 13 with inwardly, oppositely directed, vertically extending flanges 80 which preferably run from the inner surface or bottom of the channel 14 for the entire length of each of the side channels, the inner face, that is, the face adjacent the core, of each of these flanges being suitably machined for its entire length and adapted to rest against and form a guide for the side of the core. In order to provide sufficient metal adjacent the top of each of the side members of the section, for the reception of the bolts 9, I may conveniently form small lugs 81 adjacent the upper end of each channel member and form the bolt holes 8 therein. If desired, the lower section of the casing may be provided with suitable rearwardly extending flanges 83 to receive the edge of the hood of the automobile and the upper section correspondingly recessed or depressed as at 84 for a similar purpose. The operation of this form of the invention when assembled with the core will be obvious without further description.

While I have herein described and illustrated certain typical embodiments of my invention to enable those skilled in the art to comprehend and practise the principles thereof, I do not thereby desire or intend to in any way limit myself to any particular construction or detailed arrangement of the various parts as the same may be suitably modified as desired and the invention embodied in radiators of types other than those shown or otherwise adapted for the varying conditions encountered in practice without departing from the spirit and scope of the invention as defined in the appended claims.

Having thus described my invention, I claim and desire to protect by Letters Patent of the United States:

1. An automobile radiator comprising a unitary core having a header tank at its upper extremity and an outlet tank at its lower, a two-part casing surrounding said core, the lower part of said casing being of channel section to receive the core, and yielding means interposed between said core and said casing operative to yieldingly support said core in said casing said core being freely vertically removable from said lower part of said casing upon the removal of said upper part of said casing.

2. An automobile radiator comprising a two-part casing having separable lower and upper portions, the former being of channel section, a core adapted to seat within said channel, and yielding means comprising a plurality of coil springs interposed between said core and said casing to yieldingly support the former within the latter, said core being freely vertically removable from the lower of said portions upon the removal of the upper of said portions.

3. An automobile radiator comprising a two-part casing having separable upper and lower portions the latter being of channel section and adapted to receive a radiator core, a core adapted to seat within said channel and vertically removable therefrom, a plurality of pockets formed in said core, and a coil spring partially disposed in each of said pockets and adapted to yieldingly support said core within said casing.

4. An automobile radiator comprising a two-part casing having an upper and a lower portion the latter being of channel section, a core adapted to slide vertically within said channel, a spring interposed between the bottom of said core and said lower section, means for maintaining said spring in assembled position, a spring interposed between the top of said core and the upper part of said casing, and means for maintaining said spring in assembled position, said core being freely vertically removable from the lower portion of said casing upon the removal of the upper portion of said casing.

5. An automobile radiator comprising a two-part casing having separable upper and lower sections the latter forming a channel to receive a core, a core adapted to slide vertically within said channel, a coil spring interposed between the bottom of said core and said lower section, and means for maintaining said spring in assembled relation between said core and said section, said core being freely vertically removable from the lower of said sections upon the removal of the upper of said sections.

6. An automobile radiator comprising a two-part casing having an upper and a lower section the latter being of channel form, a core adapted to slide vertically within said channel, a spring interposed between the bottom of said core and said lower section, a resilient pad between said core and said section, and a spring interposed between the upper part of said core and said upper section.

7. An automobile radiator comprising a two-part casing having an upper and a lower section the latter being of channel form, a core adapted to slide vertically within said channel, a spring interposed between the bottom of said core and said lower section, a resilient pad between said core and said section, a spring interposed between the upper part of said core and said upper section, and a resilient pad between the top of said core and said upper section.

In witness whereof, I have hereunto set my hand this 18th day of October, 1921.

HERMAN Z. CUTLER.